(12) United States Patent
Shih

(10) Patent No.: US 11,644,673 B2
(45) Date of Patent: May 9, 2023

(54) NEAR-EYE OPTICAL SYSTEM

(71) Applicant: Coretronic Corporation, Hsin-Chu (TW)

(72) Inventor: Chih-Wei Shih, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 255 days.

(21) Appl. No.: 17/088,508

(22) Filed: Nov. 3, 2020

(65) Prior Publication Data

US 2021/0141230 A1 May 13, 2021

Related U.S. Application Data

(60) Provisional application No. 62/931,811, filed on Nov. 7, 2019.

(30) Foreign Application Priority Data

Jan. 21, 2020 (CN) .......................... 202020138586.9

(51) Int. Cl.
  *G02B 27/01* (2006.01)
(52) U.S. Cl.
  CPC .. *G02B 27/0172* (2013.01); *G02B 2027/0121* (2013.01); *G02B 2027/0123* (2013.01)
(58) Field of Classification Search
  CPC .... G02B 2027/0123; G02B 2027/0125; G02B 2027/0172; G02B 27/10–16
  See application file for complete search history.

(56) References Cited

U.S. PATENT DOCUMENTS 8,189,263 B1   5/2012   Wang et al.
8,665,178 B1   3/2014   Wang
(Continued)

FOREIGN PATENT DOCUMENTS

CN   104536138        4/2015
CN   104536138 A  *   4/2015   ......... G02B 27/0101
(Continued)

OTHER PUBLICATIONS

"Search Report of Europe Counterpart Application", dated Apr. 9, 2021, p. 1-p. 11.

*Primary Examiner* — Sean P Gramling
(74) *Attorney, Agent, or Firm* — JCIPRNET

(57) ABSTRACT

A near-eye optical system receiving an image beam including a first optical waveguide is provided. The first optical waveguide expands the image beam in a first direction and includes first and second surfaces, first and second beam-splitting surfaces, and a plurality of first and second reflective inclined surfaces. The first and second beam-splitting surfaces are located in the first optical waveguide and disposed in a tilted manner relative to the first and second surfaces. The first and second beam-splitting surfaces have opposite tilt directions. The first and second beam-splitting surfaces receive an image beam incident from the first surface so that a first portion of the image beam passes through and a second portion of the image beam is reflected. The near-eye optical system further reduces a thickness of the optical waveguide and alleviates the issue that the image beam is not completely projected to the optical waveguide.

22 Claims, 11 Drawing Sheets

(56) References Cited

U.S. PATENT DOCUMENTS

2008/0198471 A1* 8/2008 Amitai ............... G02B 27/0081
359/630
2017/0336552 A1 11/2017 Masuda et al.
2018/0329208 A1 11/2018 Masuda

FOREIGN PATENT DOCUMENTS

| CN | 106226902 | 12/2016 |
|----|-----------|---------|
| CN | 108333749 | 7/2018  |

* cited by examiner

NEAR-EYE OPTICAL SYSTEM

CROSS-REFERENCE TO RELATED APPLICATION

This application claims the priority benefit of U.S. provisional application Ser. No. 62/931,811, filed on Nov. 7, 2019 and China application serial no. 202020138586.9, filed on Jan. 21, 2020. The entirety of the above-mentioned patent application is hereby incorporated by reference herein and made a part of this specification.

BACKGROUND OF THE INVENTION

Field of the Invention

The invention relates to an optical system, and in particular to a near-eye optical system.

Description of Related Art

The history of near-eye optical systems such as head/helmet-mounted displays (HMDs) may be traced back to the US military in the 1970s. A projection device is used to project images or text message on a display unit into the eyes of a user.

In recent years, with the development of micro display components: the growing trend of higher resolution, smaller size, and lower power consumption, and the development of cloud technology: a large amount of information may be downloaded from the cloud anytime, anywhere, without the need for carrying a huge database. The near-eye optical system has developed into a portable display device. In addition to the military field, other related fields such as industrial production, simulation training, 3D display, medicine, sports, and video games have also grown and became important.

In an optical lens of the projection device, in order to achieve the object of a large field of view (FOV) and a small volume, many difficulties are encountered in the design. For example, since the design of the optical lens includes a large viewing angle output with limited length, f-number is increased and pupil aperture is reduced to improve the object of modulation transfer function (MTF) needed for the optical lens. However, due to the reduction of pupil aperture, the expansion in an optical waveguide is more difficult.

In addition, in order to provide a good user experience, the overall thickness of the near-eye optical system needs to be further reduced. When the thickness of the projection device is limited by the system length of the optical lens, designers usually may only reduce the thickness of the optical waveguide. However, reducing the thickness of the optical waveguide also reduces the optical coupling range of the optical waveguide. Therefore, an image beam emitted by the projection device may not be completely projected to the optical coupling region of the optical waveguide, and therefore, the thickness of the optical waveguide is still not readily reduced. Furthermore, the increase in the thickness of the optical waveguide reduces the number of total reflections of the image beam in the optical waveguide, so that an angle information transmitted by the image beam to a projection target may be discontinuous, and the situation in which the overall image lacks light or has dark streaks occurs. Such a situation is more serious particularly when the pupil aperture of the optical lens is reduced, so that user experience is poor.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a near-eye optical system further reducing a thickness of an optical waveguide and alleviating an issue that an image beam is not completely projected to the optical waveguide.

An embodiment of the invention provides a near-eye optical system configured to receive an image beam including a first optical waveguide. The first optical waveguide is configured to expand the image beam in a first direction and includes a first surface and a second surface, a first beam-splitting surface and a second beam-splitting surface, a plurality of first reflective inclined surfaces, and a plurality of second reflective inclined surfaces. The second surface is opposite to the first surface. The first beam-splitting surface and the second beam-splitting surface are located in the first optical waveguide and disposed in a tilted manner relative to the first surface and the second surface. The first beam-splitting surface and the second beam-splitting surface have opposite tilt directions. The first beam-splitting surface and the second beam-splitting surface are configured to receive an image beam incident from the first surface so that a first portion of the image beam passes through and a second portion of the image beam is reflected. The plurality of first reflective inclined surfaces are disposed on the first surface and arranged along the first direction. A tilt direction of the plurality of first reflective inclined surfaces is the same as a tilt direction of the first beam-splitting surface. The plurality of second reflective inclined surfaces are disposed on the first surface and arranged along the first direction. A tilt direction of the plurality of second reflective inclined surfaces is the same as a tilt direction of the second beam-splitting surface. The first beam-splitting surface is located between the second beam-splitting surface and the plurality of first reflective inclined surfaces, and the second beam-splitting surface is located between the first beam-splitting surface and the plurality of second reflective inclined surfaces.

Based on the above, since in the near-eye optical system of an embodiment of the invention, the image beam incident from the first surface is received via the first beam-splitting surface and second beam-splitting surface so that the first portion of the image beam passes through and the second portion of the image beam is reflected, the near-eye optical system may receive an image beam with a larger image area, and at the same time, the thickness of the first optical waveguide may be maintained.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
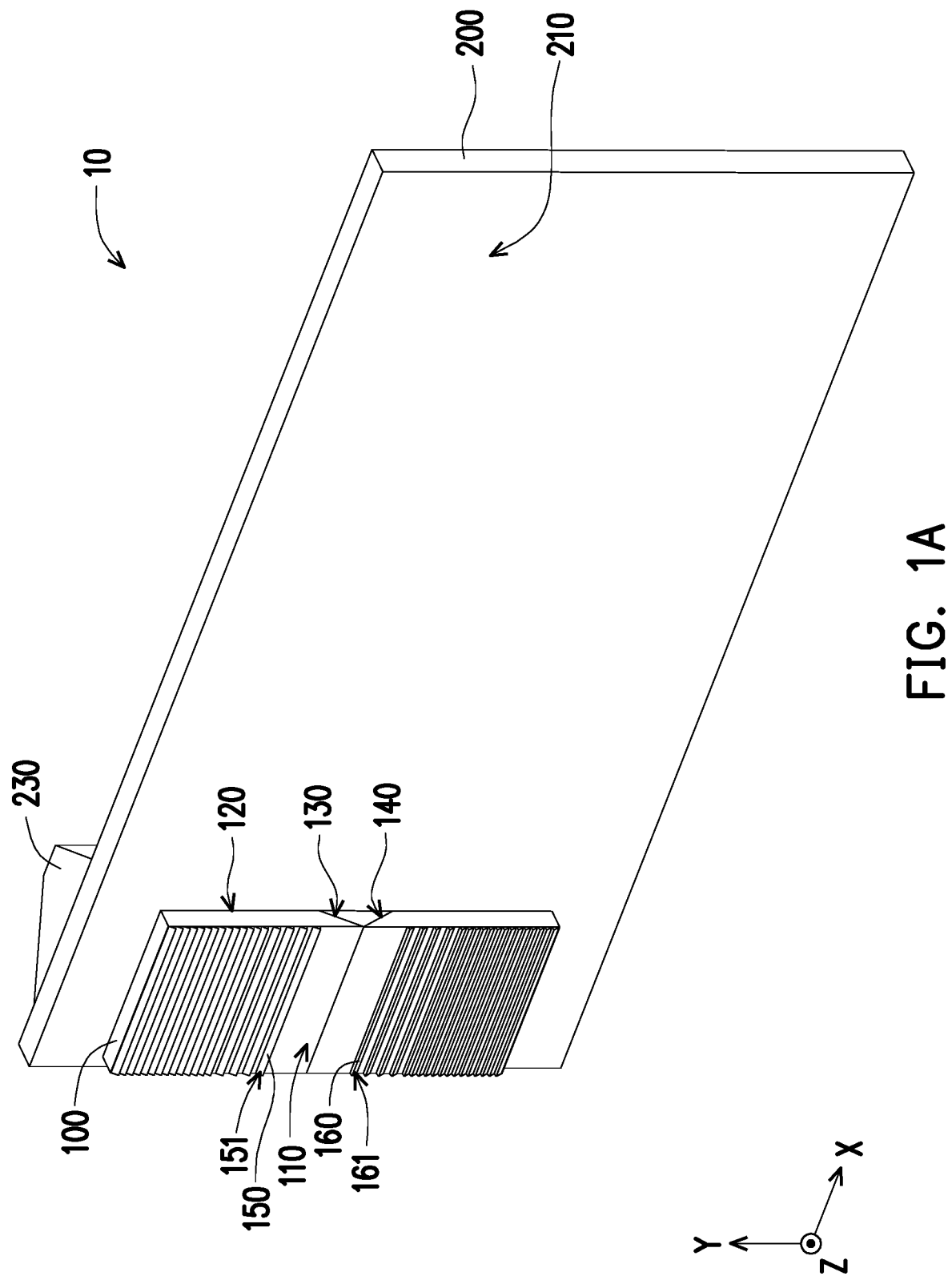
FIG. 1A is a perspective view of a viewing angle of a near-eye optical system according to an embodiment of the invention.
Figure 1B:
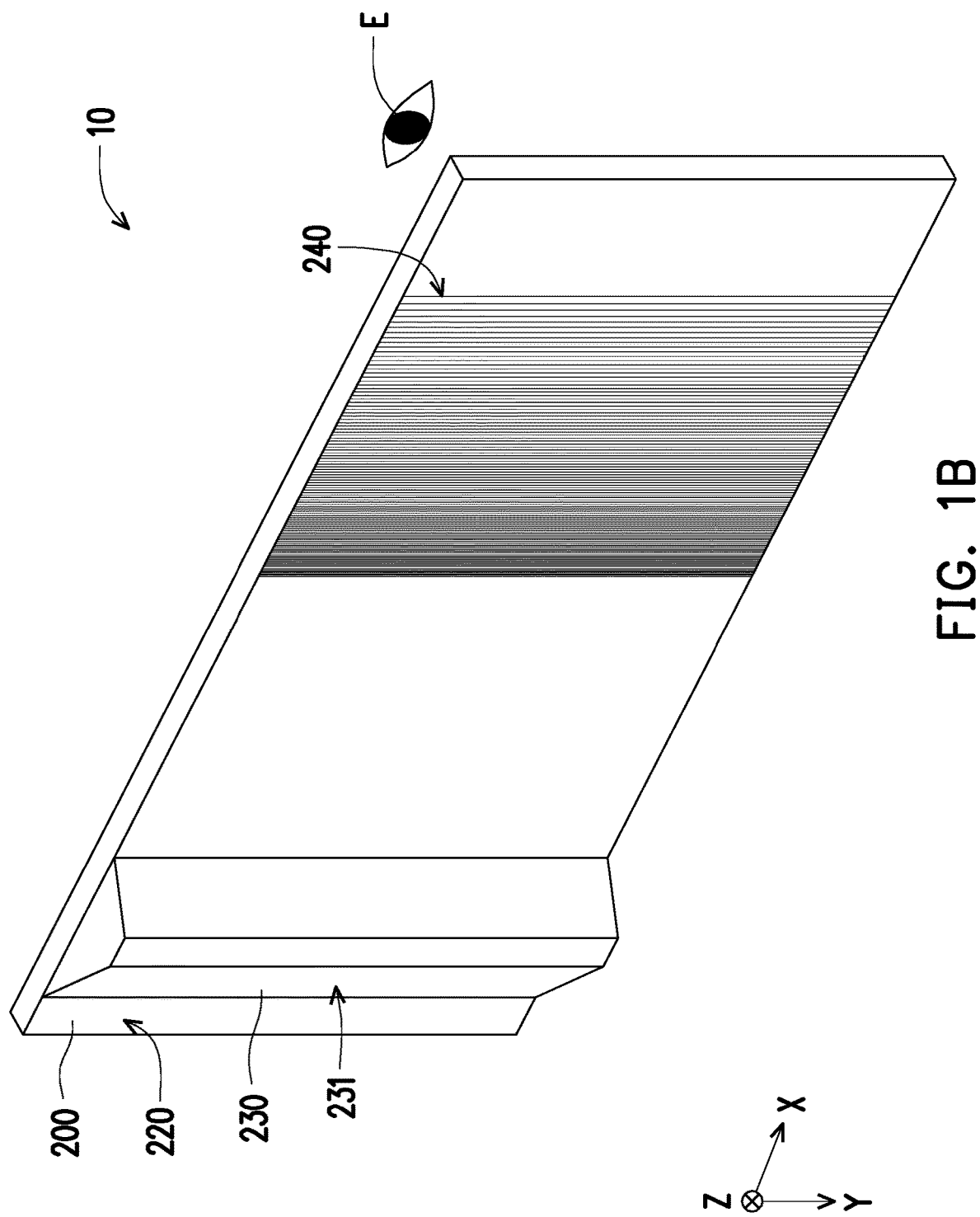
FIG. 1B is a perspective view of another viewing angle of a near-eye optical system according to an embodiment of the invention.
Figure 2:
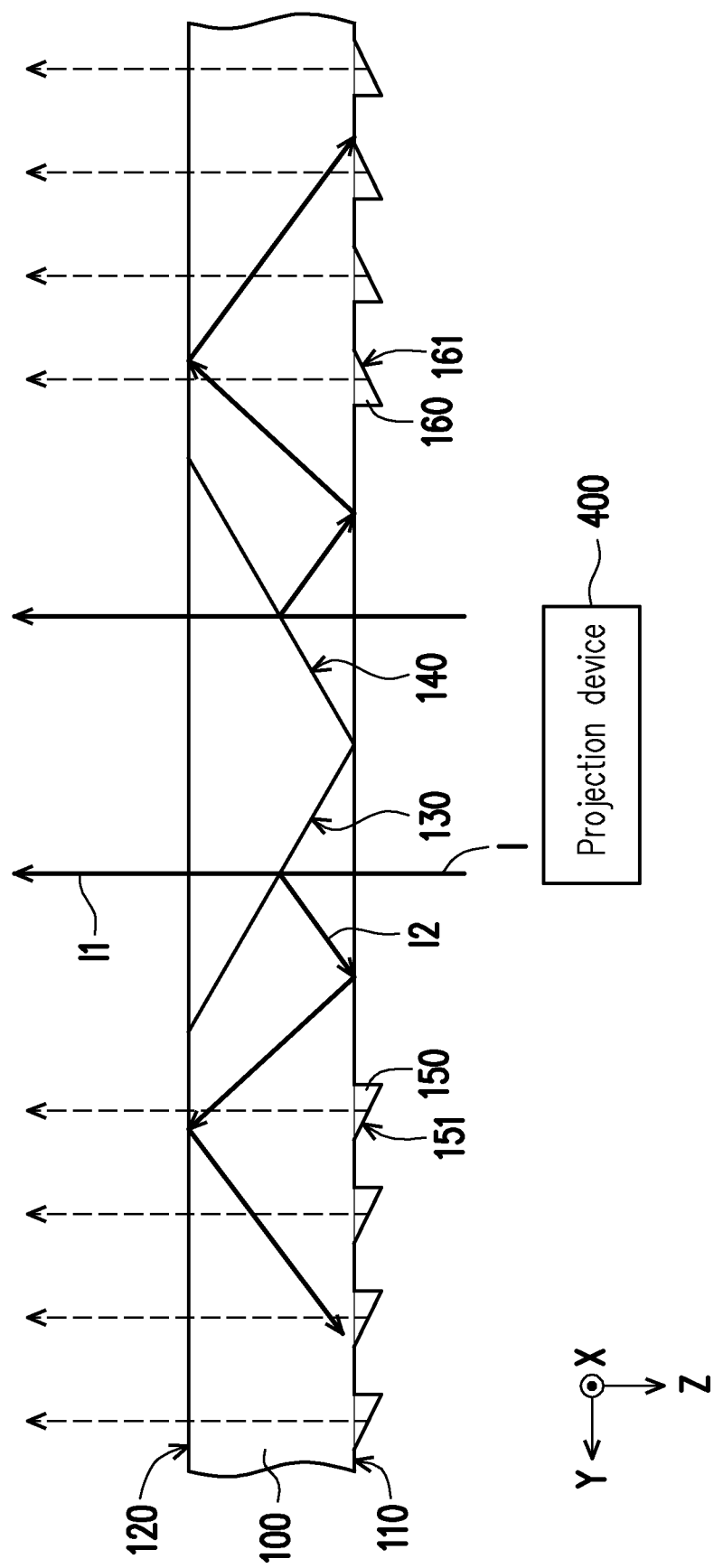
FIG. 2 shows a diagram of the transmission of an image beam in a first optical waveguide according to an embodiment of the invention.

FIG. 1A is a perspective view of a viewing angle of a near-eye optical system according to an embodiment of the invention. FIG. 1B is a perspective view of another viewing angle of a near-eye optical system according to an embodiment of the invention. Referring to FIG. 1A and FIG. 1B together, a near-eye optical system 10 of the present embodiment includes a first optical waveguide 100 and a second optical waveguide 200. A projection device (as shown in FIG. 2) emits an image beam toward a first surface 110, expands the image beam in the Y direction via the first optical waveguide 100, and transmits the image beam to the second optical waveguide 200. The second optical waveguide 200 expands the image beam in the X direction, and after the image beam is totally reflected at least once in the second optical waveguide 200, the image beam is reflected by fourth reflective inclined surfaces 240 and then incident on a projection target E, and the projection target E is, for example, the eyes of a user or a receiver (a camera or a charge-coupled device (CCD)) that may receive an image beam, but is not limited thereto. In particular, the Y direction is an arrangement direction of a plurality of first reflective inclined surfaces 151 in FIG. 1A, the Y direction is an extending direction of each of the fourth reflective inclined surfaces 240 in FIG. 1B, the X direction is an extending direction of each of the first reflective inclined surfaces 151 in FIG. 1A, and the X direction is an arrangement direction of the plurality of fourth reflective inclined surfaces 240 in FIG. 1B. The Z direction is a direction from a third surface 210 of the second optical waveguide 200 to the first surface 110 of the first optical waveguide 100 in FIG. 1A, and is perpendicular to the X direction and the Y direction.

In the present embodiment, the materials of the first optical waveguide 100 and the second optical waveguide 200 may be plastic or glass, and the refractive indices thereof may be the same or different. The first optical waveguide 100 and the second optical waveguide 200 may be bonded via an optical adhesive. In order for the image beam to be totally reflected in the first optical waveguide 100 and the second optical waveguide 200, the refractive indices of the first optical waveguide 100 and the second optical waveguide 200 are preferably greater than the refractive indices of the optical adhesive and air.

FIG. 2 shows a diagram of the transmission of an image beam in a first optical waveguide according to an embodiment of the invention. For the convenience of explanation, the first optical waveguide 100 in FIG. 2 schematically shows four first reflective inclined surfaces 151 and four second reflective inclined surfaces 161, but the number of the first reflective inclined surfaces 151 and the second reflective inclined surfaces 161 should be determined based on design requirements and is not limited. Microstructures 150 have the first reflective inclined surfaces 151 and microstructures 160 have the second reflective inclined surfaces 161. In addition, a planar area is provided between the first reflective inclined surfaces 151, and a planar area is provided between the second reflective inclined surfaces 161. That is, the microstructures 150 and the microstructures 160 are not continuously and closely disposed.

Furthermore, FIG. 2 shows an image beam I from a projection device 400 is perpendicularly incident on the first surface 110, but the image beam I should be a light cone with different angles of incidence. In the drawings of the present application, the main light ray of the image beam I represents the travel path of the image beam I.

Please refer to FIG. 1A and FIG. 2 at the same time. In detail, the near-eye optical system 10 according to an embodiment of the invention is configured to receive the image beam I. The near-eye optical system 10 further includes the projection device 400 configured to emit the image beam I toward the first surface 110 and align the image beam I with a first beam-splitting surface 130 and a second beam-splitting surface 140. The first optical waveguide 100 is configured to expand the image beam I in a first direction, wherein the first direction may be the Y direction. The first optical waveguide 100 includes the first surface 110, a second surface 120, the first beam-splitting surface 130, the second beam-splitting surface 140, the plurality of first reflective inclined surfaces 151, and the plurality of second reflective inclined surfaces 161, wherein the second surface 120 is opposite to the first surface 110.

In the present embodiment, the first beam-splitting surface 130 is located in the first optical waveguide 100 and disposed in a tilted manner relative to the first surface 110 and the second surface 120. The second beam-splitting surface 140 is located in the first optical waveguide 100 and disposed in a tilted manner relative to the first surface 110 and the second surface 120. The tilt direction of the second beam-splitting surface 140 is opposite to the tilt direction of the first beam-splitting surface 130, and the first beam-splitting surface 130 and the second beam-splitting surface 140 are V-shaped, as shown in FIG. 2. Furthermore, the first beam-splitting surface 130 and the second beam-splitting surface 140 are configured to receive the image beam I incident from the first surface 110. The first beam-splitting surface 130 and the second beam-splitting surface 140 make a first portion I1 of the image beam I pass through and reflect a second portion I2 of the image beam I. Specifically, the dotted beam in FIG. 2 represents the second portion I2 of the image beam I reflected by the plurality of first reflective inclined surfaces 151 and the plurality of second reflective inclined surfaces 161.

Since the near-eye optical system 10 according to an embodiment of the invention receives the image beam I via the first beam-splitting surface 130 and the second beam-splitting surface 140, the near-eye optical system 10 may receive the image beam I with a greater image area and may maintain the thickness of the first optical waveguide 100 at the same time. Therefore, even if the stop of the optical lens in the projection device 400 is designed inside the projection device 400 so that the area of the image beam I projected to the first surface 110 is greater, the first optical waveguide in an embodiment of the invention 100 still has enough optical coupling range to receive the image beam I completely. The so-called stop refers to the position where the image beam I has the smallest beam cross section. In addition, compared with a near-eye optical system receiving the image beam using only one beam-splitting surface, the near-eye optical system 10 of an embodiment of the invention may also alleviate the issue that the image beam I is expanded too much in the Y direction and resulting in a portion of the image beam I to not be received by the projection target E.

In an embodiment, the first beam-splitting surface 130 and the second beam-splitting surface 140 are formed by a partially-transmissive and partially-reflective film embedded in the first optical waveguide 100, such as a semi-transmissive and semi-reflective coating.

In the present embodiment, the plurality of first reflective inclined surfaces 151 are disposed on the first surface 110 and arranged along the first direction. The tilt direction of the first reflective inclined surfaces 151 is the same as the tilt direction of the first beam-splitting surface 130. The angle between the first reflective inclined surfaces 151 and the first surface 110 is different from the angle between the first beam-splitting surface 130 and the first surface 110, but is not limited thereto. In other embodiments, the angle between the first reflective inclined surfaces 151 and the first surface 110 is the same as the angle between the first beam-splitting surface 130 and the first surface 110. The plurality of second reflective inclined surfaces 161 are disposed on the first surface 110 and arranged along the first direction. The tilt direction of the second reflective inclined surfaces 161 is the same as the tilt direction of the second beam-splitting surface 140. The angle between the second reflective inclined surfaces 161 and the first surface 110 is different from the angle between the second beam-splitting surface 140 and the first surface 110, but is not limited thereto. In other embodiments, the angle between the second reflective inclined surfaces 161 and the first surface 110 is the same as the angle between the second beam-splitting surface 140 and the first surface 110.

The first beam-splitting surface 130 is located between the second beam-splitting surface 140 and the first reflective inclined surfaces 151, and the second beam-splitting surface 140 is located between the first beam-splitting surface 130 and the second reflective inclined surfaces 161.

In addition, in the present embodiment, each of the first reflective inclined surfaces 151 is extended along a second direction (for example, the X direction), such as an extended array of prism columns. Each of the second reflective inclined surfaces 161 is extended along the second direction, such as an extended array of prism columns. Each of the fourth reflective inclined surfaces 240 is extended along the first direction (for example, the Y direction), such as an extended array of prism columns. In addition, in an embodiment, a planar area is provided between the fourth reflective inclined surfaces 240, and the plurality of fourth reflective inclined surfaces 240 are not continuously and closely disposed.

Furthermore, in the present embodiment, the first reflective inclined surfaces 151 and the second reflective inclined surfaces 161 are surfaces of the plurality of convex microstructures 150 and 160 on the first surface 110.

Figure 3:
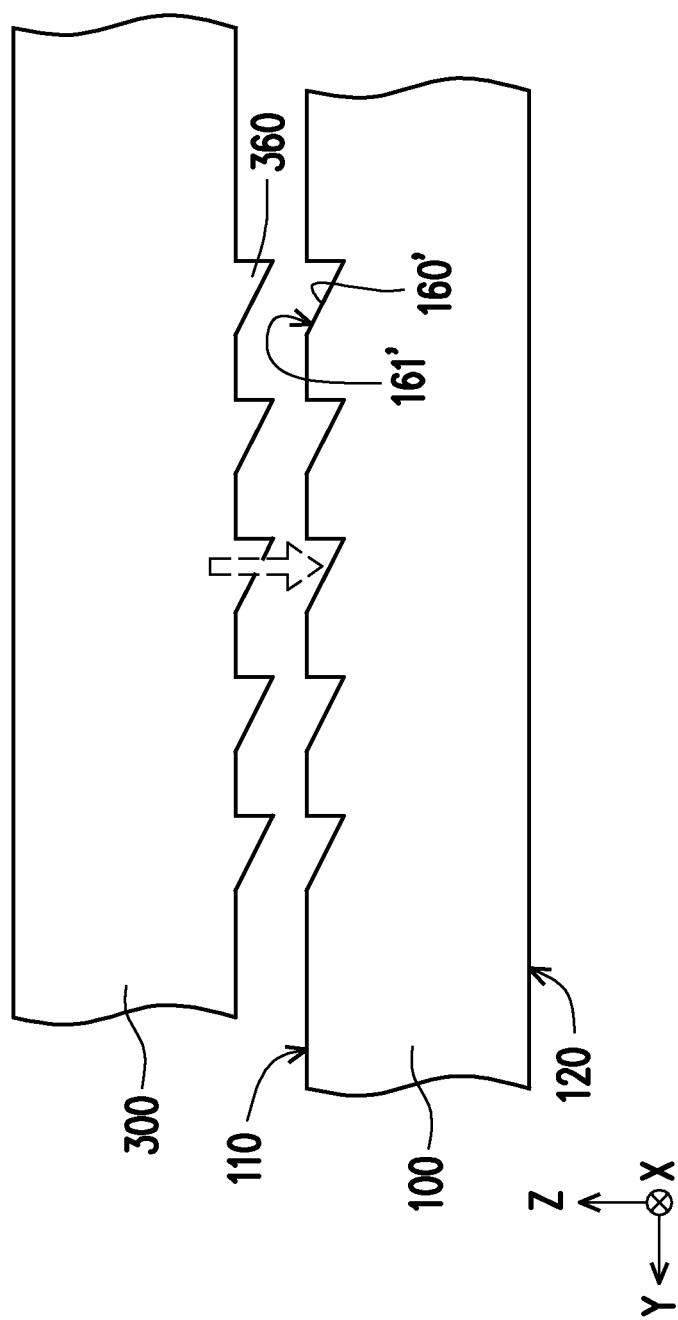
FIG. 3 shows a diagram in which first reflective inclined surfaces and second reflective inclined surfaces are a plurality of micro recesses according to an embodiment of the invention.

FIG. 3 is a diagram showing that the first reflective inclined surfaces and the second reflective inclined surfaces are a plurality of micro recesses according to an embodiment of the invention. In an embodiment, first reflective inclined surfaces and second reflective inclined surfaces 161' are surfaces of a plurality of micro recesses 160' at the first surface 110. Furthermore, the near-eye optical system 10 further includes a compensation waveguide 300. The compensation waveguide 300 is disposed on the first surface 110, wherein the compensation waveguide 300 has a plurality of convex microstructures 360 complementary in shape to the micro recesses 160' at a surface facing the first optical waveguide 100. The convex microstructures 360 have a reflective coating, so that the first reflective inclined surfaces and the second reflective inclined surfaces 161' may produce a reflection effect.

Figure 4:
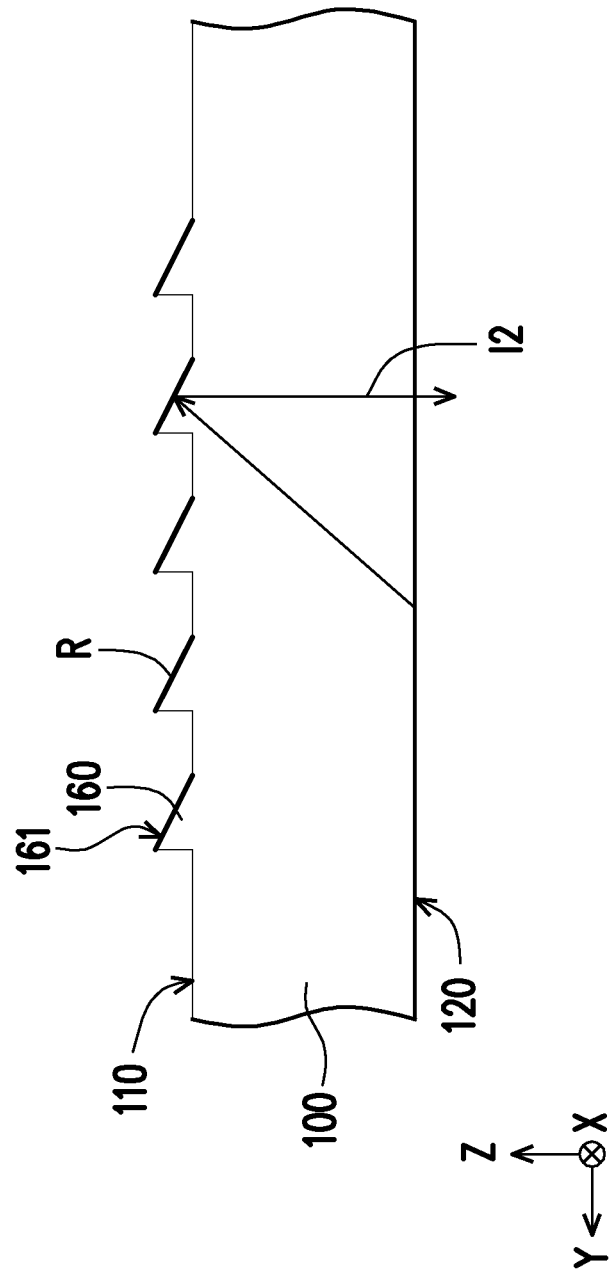
FIG. 4 is a diagram in which a reflective layer is coated on first reflective inclined surfaces and second reflective inclined surfaces according to an embodiment of the invention.

FIG. 4 is a diagram showing that a reflective layer is coated on the first reflective inclined surfaces and the second reflective inclined surfaces according to an embodiment of the invention. Please refer to FIG. 4. In the present embodiment, a reflective layer R or a partially-transmissive and partially-reflective layer is coated on the first reflective inclined surfaces 151 and the second reflective inclined surfaces 161, so that the second portion I2 of the image beam I may be reflected to the second optical waveguide 200.

Figure 5:
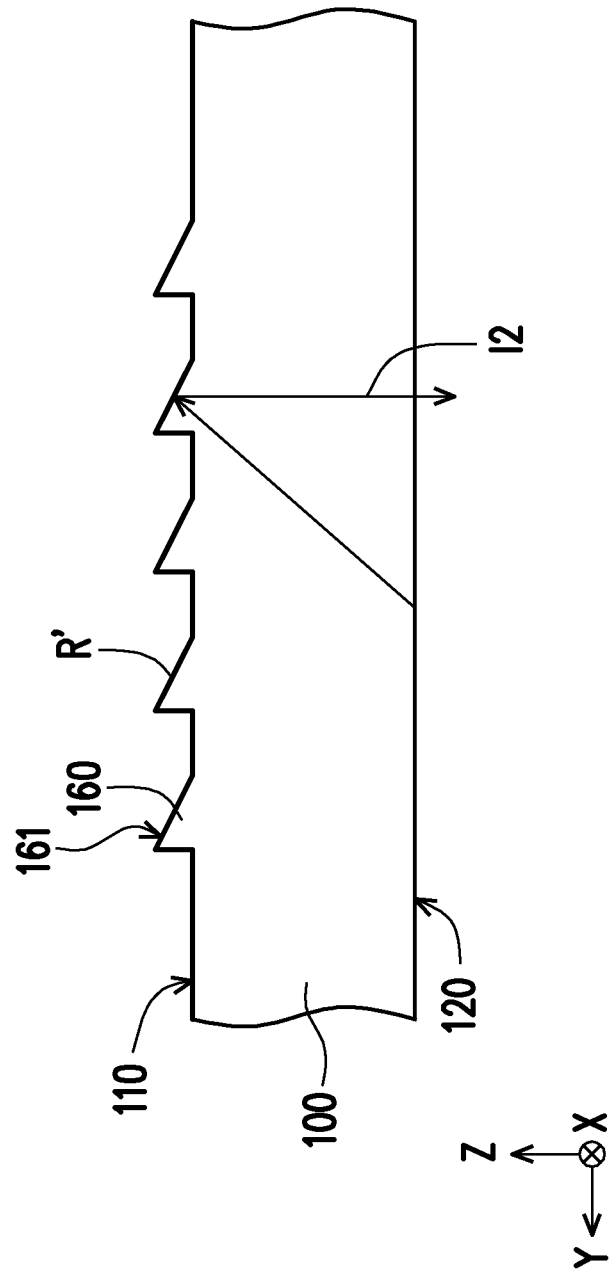
FIG. 5 is a diagram in which a reflective layer is coated on all of a first surface, first reflective inclined surfaces, and second reflective inclined surfaces according to an embodiment of the invention.

FIG. 5 is a diagram showing that a reflective layer is coated on all of the first surface, the first reflective inclined surfaces, and the second reflective inclined surfaces according to an embodiment of the invention. Referring to FIG. 5, in an embodiment, a reflective layer R' or a partially-transmissive and partially-reflective layer is coated on all of the first surface 110, the first reflective inclined surfaces 151, and the second reflective inclined surfaces 161. It should be mentioned that, in FIG. 3, the reflective layer R or the partially-transmissive and partially-reflective layer may be coated on the first reflective inclined surfaces and the second reflective inclined surfaces 161' or on the surfaces of the complementary convex microstructures 360. In detail, the second portion I2 of the image beam I in FIG. 4 and FIG. 5 is transmitted in the first optical waveguide 100 in a total reflection manner, and is reflected away from the first optical waveguide 100 via the second reflective inclined surfaces 161.

Please refer to FIG. 1A and FIG. 1B again. In the present embodiment, the second optical waveguide 200 of the near-eye optical system 10 is configured to expand the image beam I in the second direction (for example, the X direction). The second optical waveguide includes the third surface 210, a fourth surface 220, a third reflective inclined surface 231, and the plurality of fourth reflective inclined surfaces 240. Furthermore, the second surface 120 is located between the first surface 110 and the third surface 210. The fourth surface 220 is opposite to the third surface 210.

In the present embodiment, the third reflective inclined surface 231 is a surface of a convex structure 230 at one end of the fourth surface 220. The third reflective inclined surface 231 is tilted relative to the third surface 210 and the fourth surface 220. One end of the second optical waveguide 200 is disposed between the convex structure 230 and the first optical waveguide 100, and the position of the convex structure 230 corresponds to the position of the first optical waveguide 100 to receive the image beam I transmitted from the first optical waveguide 100. The plurality of fourth reflective inclined surfaces 240 are disposed on the fourth surface 220 and arranged along the second direction. Furthermore, an extending direction (for example, the Y direction) of each of the fourth reflective inclined surfaces 240 is perpendicular to an extending direction (for example, the X direction) of each of the first reflective inclined surfaces 151 and perpendicular to an extending direction (for example, the X direction) of each of the second reflective inclined surfaces 161.

In addition, the image beam I emitted from the second surface 120 is transmitted to the convex structure 230, reflected by the third reflective inclined surface 231, enters the second optical waveguide 200, then totally reflected by the third surface 210 and the fourth surface 220 and transmitted in the second optical waveguide 200, and the fourth reflective inclined surfaces 240 reflect the image beam I toward the third surface 210 and makes the image beam I exit from the third surface 210 to be transmitted to the projection target E.

Next, in order to provide better imaging effect to the image beam I on the projection target E, the image beam I is uniformly imaged on the projection target E, and the generation of ghost images is reduced. The relationship between the components in the near-eye optical system 10 in an embodiment of the invention is described below.

Please refer to FIG. 2 again. In the present embodiment, the transmittances of the first beam-splitting surface 130 and the second beam-splitting surface 140 to the image beam I are less than the reflectances of the first beam-splitting surface 130 and the second beam-splitting surface 140 to the image beam I. Furthermore, the transmittances of the first beam-splitting surface 130 and the second beam-splitting surface 140 to the image beam I are less than or equal to a ratio of the viewing angle range formed by the first portion I1 of the image beam I at the projection target E and the viewing angle range formed by the entire image beam I at the projection target E.

Figure 6:
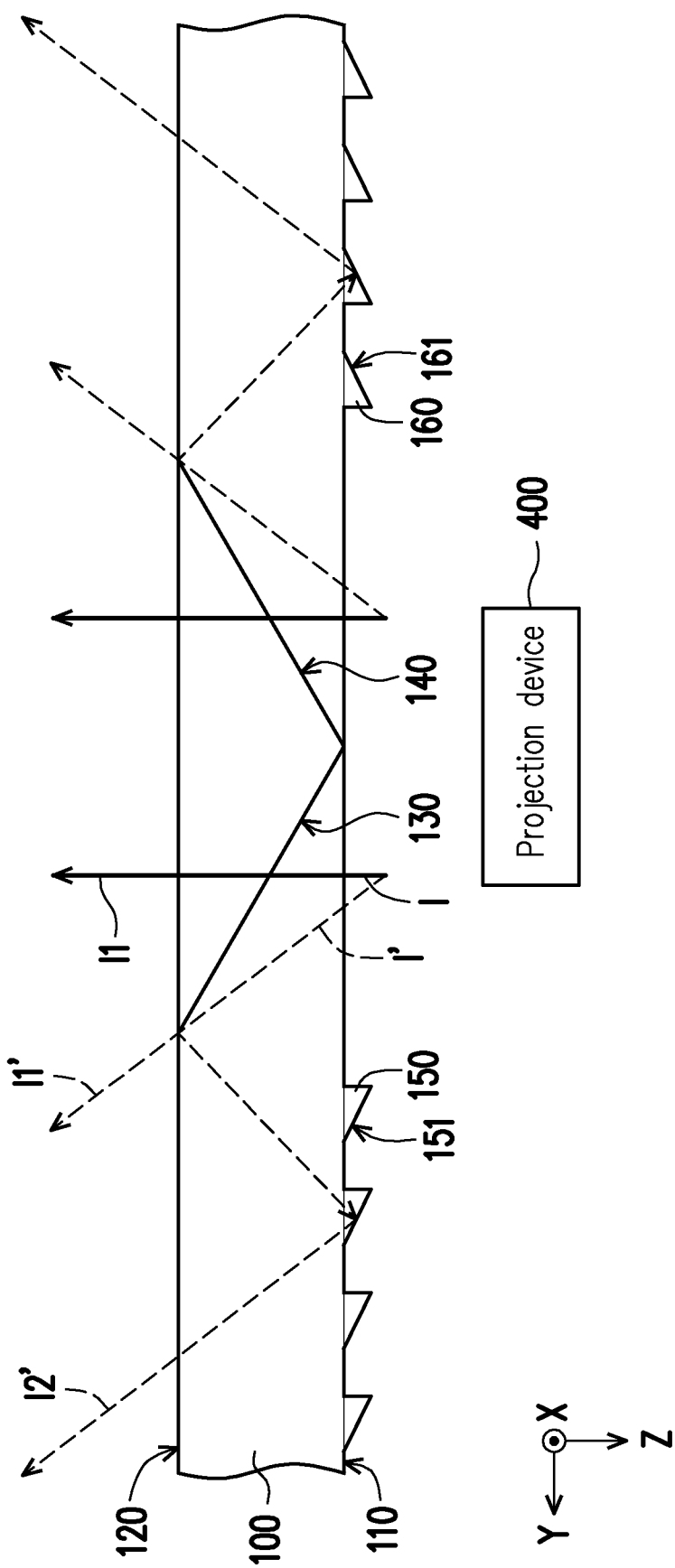
FIG. 6 is a diagram of the transmission of an image beam in a first optical waveguide under different incident angles according to an embodiment of the invention.

FIG. 6 is a diagram of the transmission of an image beam in a first optical waveguide under different incident angles according to an embodiment of the invention. FIG. 6 schematically shows the image beam I perpendicularly incident on the first surface 110 and an image beam I' not perpendicularly incident on the first surface 110. The image beam I' is incident on the first beam-splitting surface 130 and the second beam-splitting surface 140 to generate a transmissive first portion I1' and a reflected second portion I2'. Please refer to FIG. 2 and FIG. 6 at the same time. The second portion I2 of the light beam I and the first portion I1' of the light beam I' may be staggered on the optical path, and the second portion I2 of the light beam I and the second portion I2' of the light beam I' may be staggered on the optical path. Furthermore, the projection device 400 may project a plurality of image beams, and each image beam may be emitted from a different projection position. By analogy, in the present embodiment, the viewing angle range formed by the first portion I1 of the image beam I at the projection target E and a viewing angle range formed by the second portion I2 of the image beam I at the projection target are partially overlapped.

Figure 7:
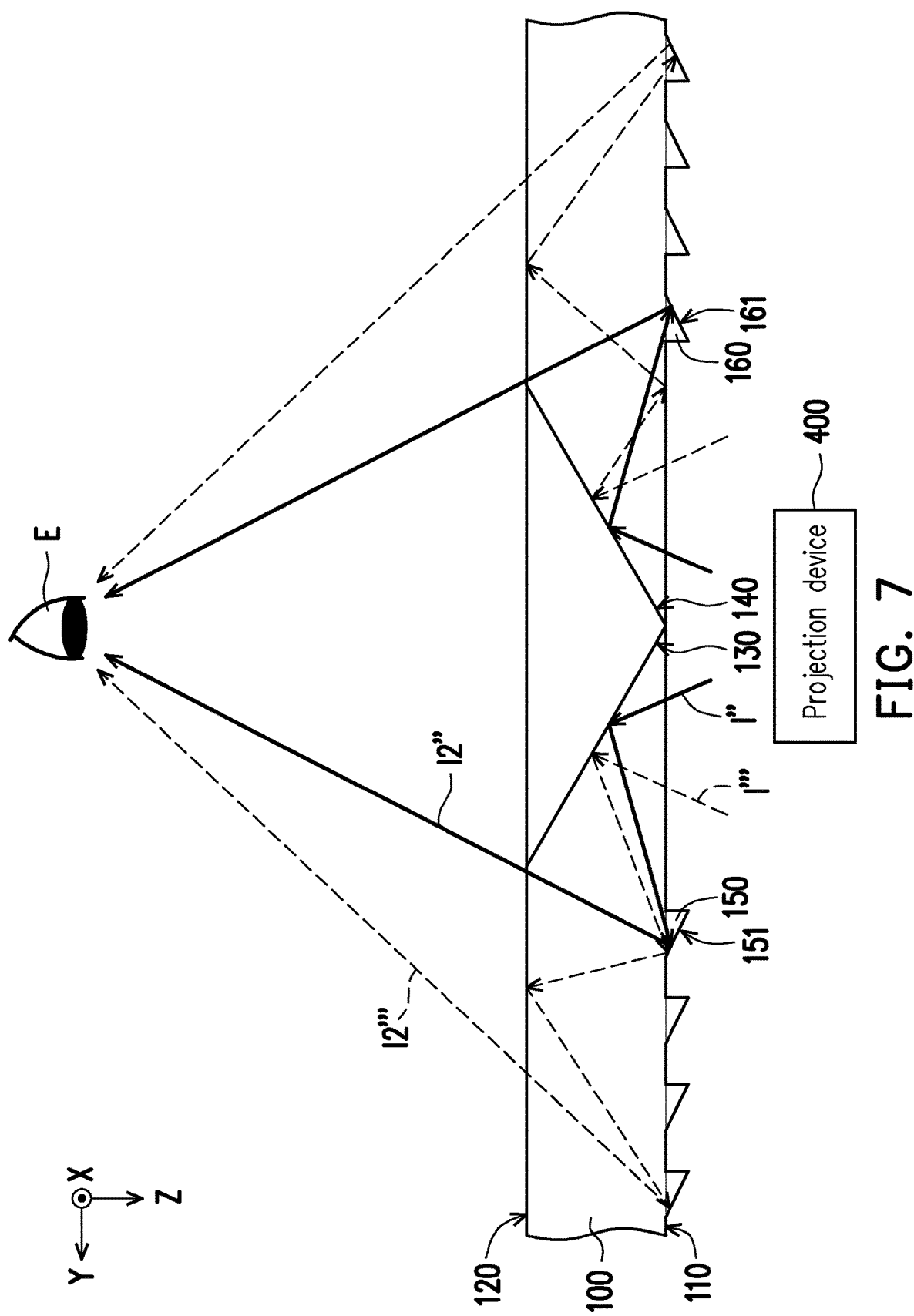
FIG. 7 is another diagram of the transmission of an image beam in a first optical waveguide under different incident angles according to an embodiment of the invention.

FIG. 7 is another diagram of the transmission of an image beam in a first optical waveguide under different incident angles according to an embodiment of the invention. FIG. 7 shows image beams I" and I''' from the projection device 400 incident on the first surface 110 at different angles, respectively. The image beams I" and I''' are reflected by the first beam-splitting surface 130 and the second beam-splitting surface 140, respectively, to generate image beams I2" and I2''' of the second portion. In order to facilitate the explanation that the image beams I2" and I2''' of the second portion are respectively guided to the projection target E at different angles at the end, FIG. 7 shows the projection target E is located adjacent to the position of the second surface 120, but the actual position of the projection target E should be determined based on the overall consideration of the optical path. Referring to FIG. 7, each of the first reflective inclined surfaces 151 and second reflective inclined surfaces 161 guides the image beams I" and I''' at different angles to the projection target E. As described above, the projection device 400 may project a plurality of image beams, and each image beam is emitted from a different projection position. By analogy, in the present embodiment, the viewing angle ranges formed by adjacent first reflective inclined surfaces 151 at the projection target E are partially overlapped with each other, and the viewing angle ranges formed by adjacent second reflective inclined surfaces 161 at the projection target E are partially overlapped with each other.

Figure 8:
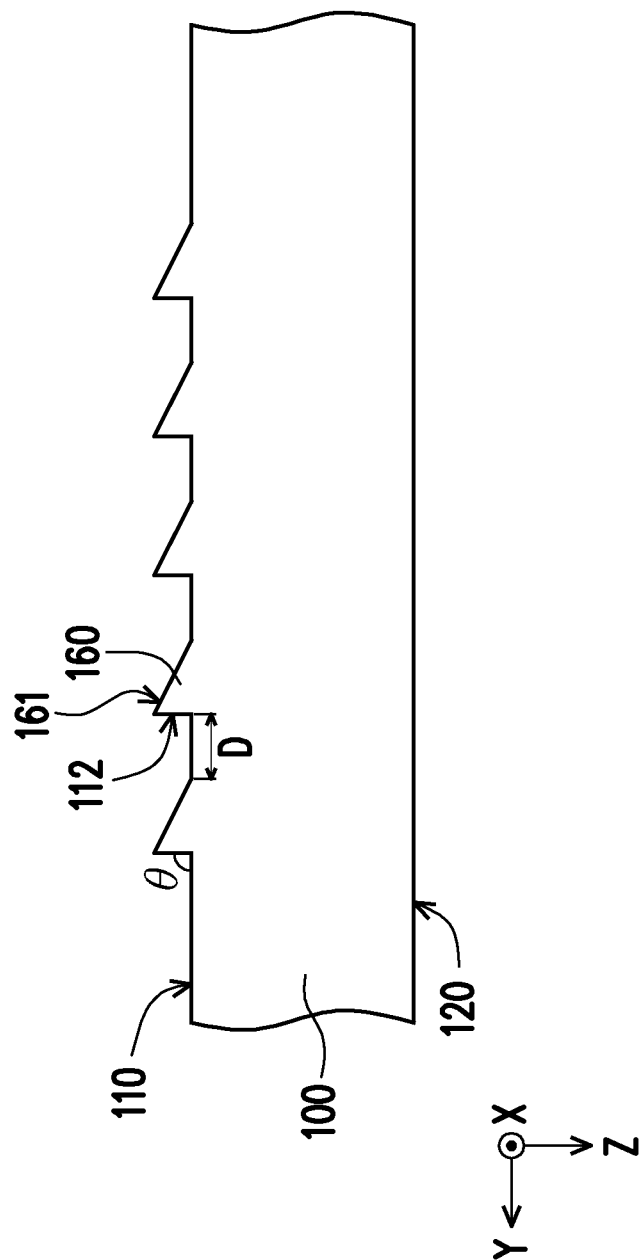
FIG. 8 is a diagram of second reflective inclined surfaces according to an embodiment of the invention.
Figure 9:
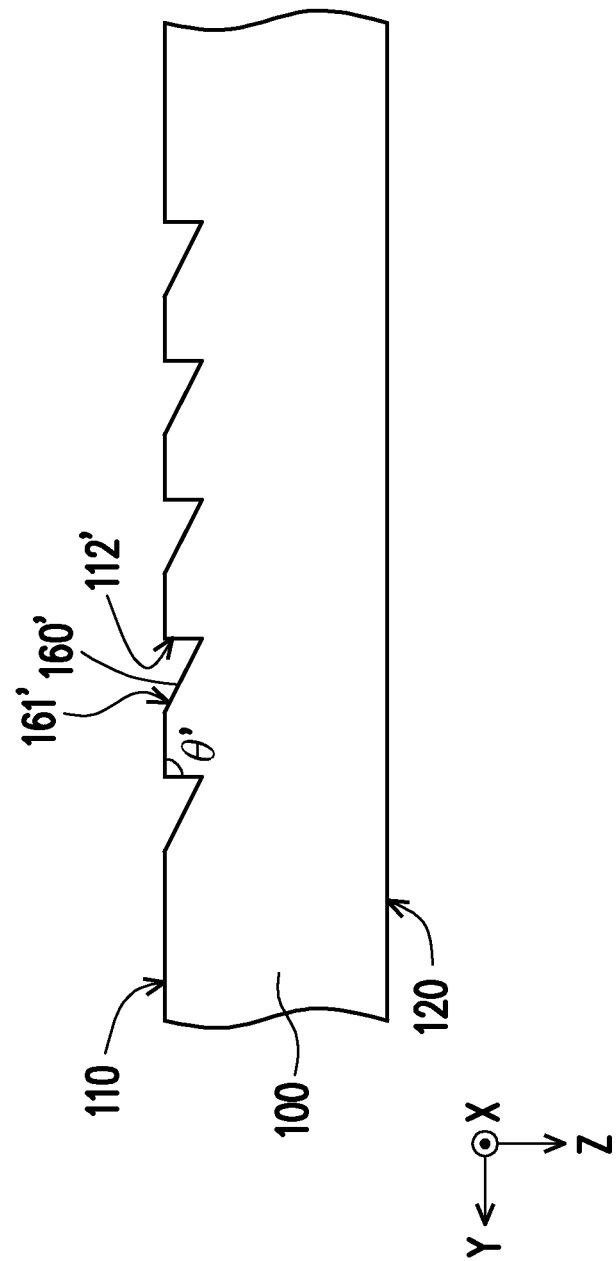
FIG. 9 is a diagram of a plurality of micro recesses on second reflective inclined surfaces according to an embodiment of the invention.

FIG. 8 is a diagram of the second reflective inclined surfaces according to an embodiment of the invention. FIG. 9 is a diagram of a plurality of micro recesses on the second reflective inclined surfaces according to an embodiment of the invention. For convenience of illustration, FIG. 8 and FIG. 9 omit the portion of the first optical waveguide 100 on the first reflective inclined surfaces 151, but the portion of the first optical waveguide 100 on the first reflective inclined surfaces 151 may also be equivalent to the architecture in which the second reflective inclined surfaces are a plurality of micro recesses. Please refer to FIG. 8 and FIG. 9. In FIG. 8, one end of the second reflective inclined surfaces 161 is connected to the first surface 110 via a connecting surface 112. In FIG. 9, one end of the second reflective inclined surfaces 161' is connected to the first surface 110 via a connecting surface 112'. In order to avoid the generation of ghost images, the image beam I should directly penetrate the second surface 120 after being reflected by the second reflective inclined surfaces 161 and 161' and transmitted to the second optical waveguide 200. That is, in order to prevent the image beam I from being totally reflected by the second surface 120 of the first optical waveguide 100 onto the second reflective inclined surfaces 161 and 161' after being reflected by the second reflective inclined surfaces 161 and 161', an angle θ between the connecting surface 112 and the first surface 110 in FIG. 8 is preferably less than 90 degrees, and an angle θ' between the connecting surface 112' and the first surface 110 in FIG. 9 is preferably less than 90 degrees.

In addition, the plurality of first reflective inclined surfaces 151 and the plurality of second reflective inclined surfaces 161 in FIG. 2 to FIG. 9 are arranged at equal intervals. For example, in FIG. 8, the plurality of second reflective inclined surfaces 161 are arranged at equal intervals D, but the invention is not limited thereto. In order to consider the imaging effect and reduce the generation of ghost images, in an embodiment, the first reflective inclined surfaces 151 may be arranged at non-equidistant intervals, and the second reflective inclined surfaces 161 may be arranged at non-equidistant intervals.

Based on the above, in an embodiment of the invention, due to the design of the transmittance and reflectance of the near-eye optical system 10 in the first beam-splitting surface 130 and the second beam-splitting surface 140, the design in which the viewing angle ranges formed by each portion of the image beam I at the projection target E are partially overlapped, the design of the angle θ between the connecting surfaces 112 and 112' and the first surface 110, or the design of the interval D between the first reflective inclined surfaces 151 and the interval D between the second reflective inclined surfaces 161, the image beam I may be uniformly imaged on the projection target E, and the occurrence of lack of light or dark streaks may be reduced.

Please refer to FIG. 1B again. Ii should be mentioned that, in the present embodiment, the third reflective inclined surface 231 is a surface of the convex structure 230 at one end of the fourth surface 220 that may also prevent the image beam I from being totally reflected by the fourth surface 220 of the second optical waveguide 200 onto the third reflecting inclined surface 231 after being reflected by the third reflective inclined surface 231. That is, in the near-eye optical system 10 of an embodiment of the invention, the third reflective inclined surface 231 is designed as the surface of the convex structure 230 at one end of the fourth surface 220, which may also prevent the image beam I of the same angle emitted by the projection device 400 at different positions to be received by the projection target E at a different angle at the end. Therefore, the near-eye optical system 10 of an embodiment of the invention may further avoid the occurrence of ghost images.

Figure 10:
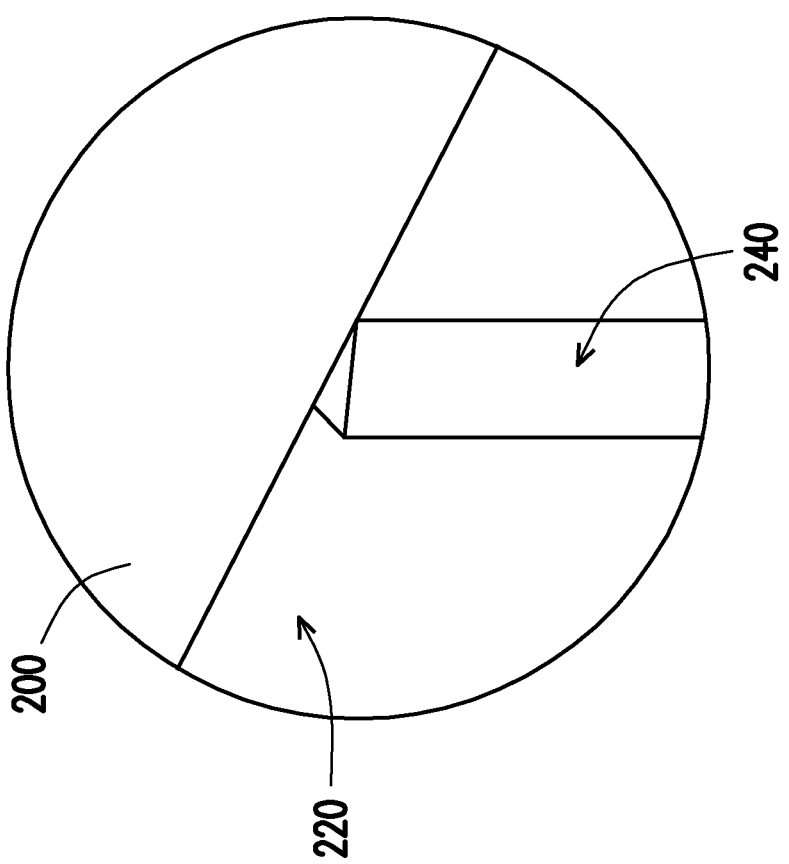
FIG. 10 is a partially enlarged view of a second optical waveguide of FIG. 1B on fourth reflective inclined surfaces.

FIG. 10 is a partially enlarged view of the second optical waveguide of FIG. 1B on the fourth reflective inclined surfaces. Referring to FIG. 10, in the present embodiment, a reflective layer may be coated on the fourth reflective inclined surfaces 240 of the second optical waveguide 200, or a reflective layer may be coated on both the fourth surface 220 and the fourth reflective inclined surfaces 240, so that the near-eye optical system 10 may be a virtual reality (VR) system. In an embodiment, a partially-transmissive and partially-reflective layer may be coated on the fourth reflective inclined surfaces 240 of the second optical waveguide 200, or a partially-transmissive and partially-reflective layer may be coated on both the fourth surface 220 and the fourth reflective inclined surfaces 240, so that the near-eye optical system 10 may be an augmented reality (AR) system, so that the projection target E may receive the image beam I and also receive ambient beam (not shown) at the same time.

Based on the above, since in the near-eye optical system of an embodiment of the invention, the image beam incident from the first surface is received via the first beam-splitting surface and second beam-splitting surface so that the first portion of the image beam passes through and the second portion of the image beam is reflected, the near-eye optical system may receive an image beam with a larger image area, and at the same time, the thickness of the first optical waveguide may be maintained. Furthermore, in the near-eye optical system of an embodiment of the invention, since the tilt direction of the first reflective inclined surfaces is the same as the tilt direction of the first beam-splitting surface, and the tilt direction of the second reflective inclined surfaces is the same as the tilt direction of the second beam-splitting surface, the near-eye optical system may expand the image beam in the first direction.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A near-eye optical system configured to receive an image beam, wherein the near-eye optical system comprises:
   a first optical waveguide configured to expand the image beam in a first direction and comprising:
      a first surface;
      a second surface opposite to the first surface;
      a first beam-splitting surface located in the first optical waveguide and disposed in a tilted manner relative to the first surface and the second surface;
      a second beam-splitting surface located in the first optical waveguide and disposed in a tilted manner relative to the first surface and the second surface, wherein a tilt direction of the second beam-splitting surface is opposite to a tilt direction of the first beam-splitting surface, and the first beam-splitting surface and the second beam-splitting surface are configured to receive the image beam incident from the first surface so that a first portion of the image beam passes through and a second portion of the image beam is reflected;
      a plurality of first microstructures and a plurality of second microstructures formed on the first surface, wherein the plurality of first microstructures comprise a plurality of first reflective inclined surfaces disposed on the first surface and arranged along the first direction, wherein a tilt direction of the plurality of first reflective inclined surfaces is the same as the tilt direction of the first beam-splitting surface;
   wherein the plurality of second microstructures comprise a plurality of second reflective inclined surfaces disposed on the first surface and arranged along the first direction, wherein a tilt direction of the plurality of second reflective inclined surfaces is the same as the tilt direction of the second beam-splitting surface, the first beam-splitting surface is located between the second beam-splitting surface and the plurality of first reflective inclined surfaces, and the second beam-splitting surface is located between the first beam-splitting surface and the plurality of second reflective inclined surfaces, wherein a planar area is provided between the plurality of first microstructures.

2. The near-eye optical system of claim 1, wherein transmittances of the first beam-splitting surface and the second beam-splitting surface to the image beam are less than reflectances thereof.

3. The near-eye optical system of claim 1, wherein transmittances of the first beam-splitting surface and the second beam-splitting surface to the image beam are less than or equal to a ratio of a viewing angle range formed by the first portion of the image beam at a projection target and a viewing angle range formed by the entire image beam at the projection target.

4. The near-eye optical system of claim 1, wherein the plurality of first microstructures and the plurality of second microstructures are a plurality of convex microstructures, and the plurality of first reflective inclined surfaces and the plurality of second reflective inclined surfaces are surfaces of the plurality of convex microstructures.

5. The near-eye optical system of claim 1, wherein the plurality of first microstructures and the plurality of second microstructures are a plurality of micro recesses, and the plurality of first reflective inclined surfaces and the plurality of second reflective inclined surfaces are surfaces of the plurality of micro recesses.

6. The near-eye optical system of claim 5, further comprising a compensation waveguide disposed on the first surface, wherein the compensation waveguide has a plurality of convex microstructures complementary in shape to the plurality of micro recesses at a surface facing the first optical waveguide.

7. The near-eye optical system of claim 6, wherein a reflective layer or a partially-transmissive and partially-reflective layer is coated on the plurality of first reflective inclined surfaces and the plurality of second reflective inclined surfaces.

8. The near-eye optical system of claim 1, wherein a reflective layer or a partially-transmissive and partially-reflective layer is coated on all of the first surface, the plurality of first reflective inclined surfaces, and the plurality of second reflective inclined surfaces.

9. The near-eye optical system of claim 1, wherein a reflective layer or a partially-transmissive and partially-reflective layer is coated on both the plurality of first reflective inclined surfaces and the plurality of second reflective inclined surfaces.

10. The near-eye optical system of claim 1, further comprising a second optical waveguide configured to expand the image beam in a second direction, and the second optical waveguide comprises:
    a third surface, wherein the second surface is located between the first surface and the third surface;
    a fourth surface opposite to the third surface;
    a third reflective inclined surface inclined relative to the third surface and the fourth surface; and
    a plurality of fourth reflective inclined surfaces disposed on the fourth surface and arranged along the second direction, wherein the image beam emitted from the second surface is reflected by the third reflective inclined surface and then is reflected by the third surface and the fourth surface to be transmitted in the second optical waveguide, and the plurality of fourth reflective inclined surfaces reflect the image beam toward the third surface so that the image beam is emitted from the third surface and transmitted to a projection target.

11. The near-eye optical system of claim 10, wherein an extending direction of each of the fourth reflective inclined surfaces is perpendicular to an extending direction of each of the first reflective inclined surfaces and perpendicular to an extending direction of each of the second reflective inclined surfaces.

12. The near-eye optical system of claim 11, wherein each of the first reflective inclined surfaces is extended along the second direction, each of the second reflective inclined surfaces is extended along the second direction, and each of the fourth reflective inclined surfaces is extended along the first direction.

13. The near-eye optical system of claim 10, wherein a planar area is provided between the plurality of fourth reflective inclined surfaces.

14. The near-eye optical system of claim 10, wherein the third reflective inclined surface is a surface of a convex structure at one end of the fourth surface.

15. The near-eye optical system of claim 1, wherein a viewing angle range formed by the first portion of the image beam at a projection target and a viewing angle range formed by the second portion of the image beam at the projection target are partially overlapped.

16. The near-eye optical system of claim 15, wherein viewing angle ranges of adjacent first reflective inclined surfaces formed at the projection target are partially overlapped with each other, and viewing angle ranges of adjacent second reflective inclined surfaces formed at the projection target are partially overlapped with each other.

17. The near-eye optical system of claim 16, wherein the plurality of first reflective inclined surfaces are arranged at non-equidistant intervals, and the plurality of second reflective inclined surfaces are arranged at non-equidistant intervals.

18. The near-eye optical system of claim 1, further comprising a projection device configured to emit the image beam toward the first surface and align the image beam with the first beam-splitting surface and the second beam-splitting surface.

19. The near-eye optical system of claim 1, wherein the first beam-splitting surface and the second beam-splitting surface are formed by a partially-transmissive and partially-reflective film embedded in the first optical waveguide.

20. The near-eye optical system of claim 1, wherein the first beam-splitting surface and the second beam-splitting surface are V-shaped.

21. The near-eye optical system of claim 1, wherein the planar area is provided between the plurality of first reflective inclined surfaces.

22. The near-eye optical system of claim 1, wherein a planar area is provided between the plurality of second reflective inclined surfaces.

* * * * *